March 20, 1945.  J. R. GAMMETER  2,371,818
THIN ARTICLE REMOVING APPARATUS
Filed Oct. 4, 1943
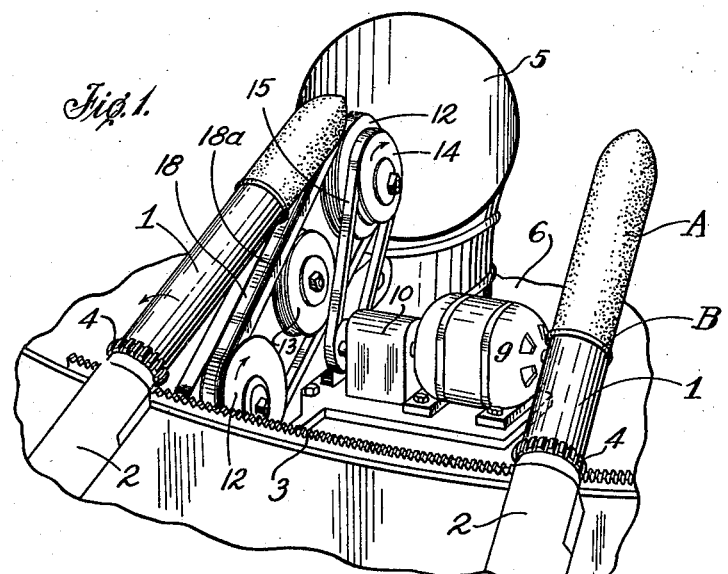
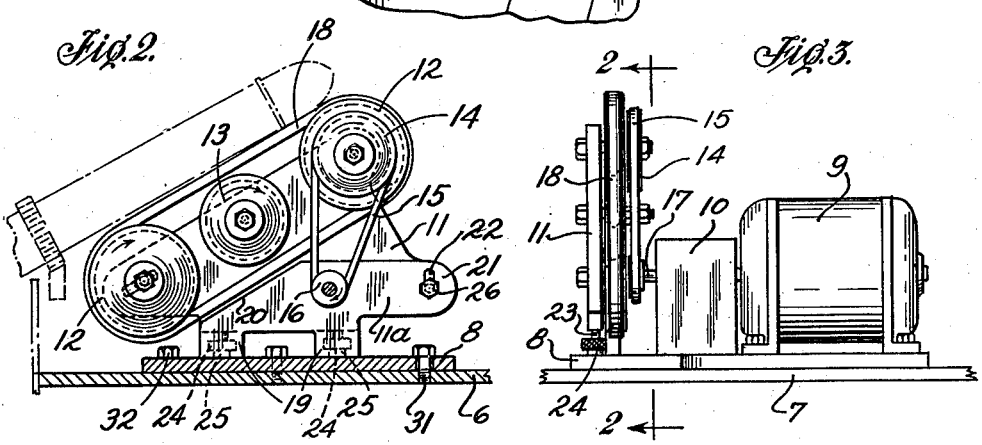
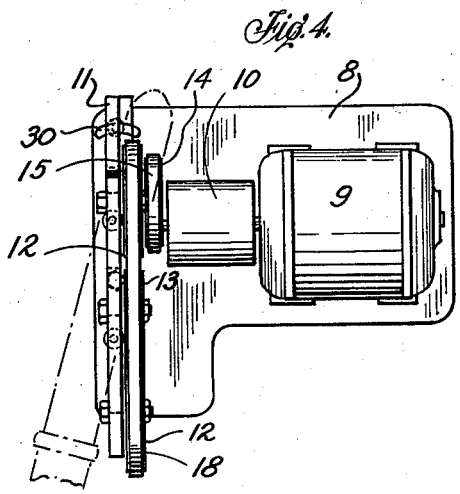
Inventor
JOHN R. GAMMETER
By Richey & Watts
Attorneys Patented Mar. 20, 1945

2,371,818

UNITED STATES PATENT OFFICE 2,371,818

THIN ARTICLE REMOVING APPARATUS

John R. Gammeter, Akron, Ohio

Application October 4, 1943, Serial No. 504,955

6 Claims. (Cl. 18—2)

This invention relates generally to the art of making thin, rubber-like articles, and particularly to a new and improved apparatus for removing such articles from elongated forms.

Heretofore the manufacture of thin dipped articles from solutions, dispersions or emulsions of rubber or latex has involved one or more operations of removing the articles from forms by rolling the articles upon themselves from their open ends toward their closed ends. These operations have been performed by hand heretofore with resulting injury to many of the articles and non-uniformity of the articles as regards rolled size. One illustration of such hand removal is shown at station F of my Patent No. 2,221,323.

The present invention aims to avoid the handwork previously expended in the operation of removing thin articles from forms with its attendant disadvantages and costs and to insure greater uniformity in rolled size of the articles; and accomplishes these purposes by a simple, effective, and novel combination of mechanical parts.

In the drawing accompanying and forming a part of this specification,

Figure 1 is a perspective view of one form of apparatus embodying the present invention;

Figure 2 is a side elevational view taken on line 2—2 of Fig. 3;

Figure 3 is a side elevational view of part of the apparatus shown in Fig. 1; and, Figure 4 is a top plan view of part of the apparatus of Fig. 1.

In Fig. 1 the forms 1 are rotatably mounted on supports 2 which are attached to a carrier (not shown) for moving the forms in a predetermined line, in this case a circular path. A fixed rack 3 engages with pinions 4 on the ends of the forms adjacent to supports 2 and serves to rotate the forms when they are being moved along their predetermined path. If desired, the rack 3 and pinions 4 may be omitted. A funnel-shaped discharge chute 5 is disposed to receive articles removed from forms 1. This chute, in the present instance, extends down thru the fixed top 6 of a circular table and opens into a receptacle to receive the goods passing thru the chute.

On table top 6 is fixed a base 8 on which is mounted a motor 9, a gear reducing unit 10 and a two-part bracket 11 carrying a plurality of pulleys 12, 13 and 14. Pulleys 12 and 13 have parallel axes arranged in a plane preferably parallel to a plane passing thru the longitudinal axis of a form 1 when the latter is vertically in line with these pulleys. The pulley 14 is connected to one pulley 12 to rotate therewith and is driven by a belt 15 which passes around pulley 16 connected to drive shaft 17, which in turn is driven by the motor 9 thru reduction gearing unit 10. A belt 18 connects the two pulleys 12 and may engage pulley 13 when pressure is applied to the belt by a form. Preferably, one edge of the belt 18 is rounded, as is better shown at 18a in Fig. 1. The driven pulley 12, which in Fig. 2 is the lower one, is adjustable toward and away from the other pulley 12 so that the proper amount of tension may be applied to belt 17. Pulley 13 may be omitted if desired.

The bracket 11 is preferably made in two plates, one of which, 11, carries pulleys 12, 13 and 14, and the other of which, 11a, is disposed beneath belt 18. The plate 11a has legs 19 attached to base 8, a beveled upper surface 20 to accommodate belt 18, and an extension 21 provided with a slotted opening 22. The pulley-carrying plate 11 is supported by studs 23 having screw-threaded engagement in nuts 24 carried by tubular supports 25 attached to plate 8. By turning nuts 24 the plate 11 may be adjusted vertically toward and away from base 8. Plate 11 carries a bolt 26 which projects thru slotted hole 22 of plate 11a and secures plates 11 and 11a together.

The base 8 is adjustably attached to the top of table 6 by cap screws, one of which, 31, extends thru an arcuate-shaped opening 30 of base 8. By loosening this cap screw plate 8 may be pivoted around a corresponding cap screw 32 within the limits permitted by opening 30.

Assuming that the parts of the above described apparatus are assembled and adjusted to substantially the position shown, and that the belt 18 is being driven in the direction indicated by the arrows on Fig. 4, and that thin walled articles are held on forms 1 in unrolled, slightly distended condition, the operation of the apparatus is substantially as follows: As each form 1 carrying an article A moves sidewise past belt 18, the upwardly moving reach of the belt engages the strengthening ring B on the open end of article A and rolls the article on itself and toward the free end of the form and finally removes the article from the form and impels it into the open mouth of chute 5. The belt is driven at such speed, in relation to the speed of the form, that the article is rolled upon itself to a place so closely adjacent to its closed end that the friction between the article and form can no longer hold the article thereon, and thereupon the rolled article is propelled off the form and into chute 5.

It will be noted that the longitudinal axis of each form 1 is inclined at a small angle to the plane of belt 18 so that the ring B on the article on the form is first engaged by the belt 18 and so that the belt continues to engage with the ring as the article is rolled toward the free end of the form. In other words, the supported end of the form is slightly in advance of the free end of the form while the form is passing over the belt 18. By reason of this angularity of the form and belt, the form may pass rapidly over the relatively narrow belt and yet the article may be rolled for the full length of the form during that brief interval of time.

As the angularity of the belt 18 to the form 1 is increased the speed of travel of the belt may be decreased, for the article on the form will be in contact with the narrow belt for a longer time due to that increased angularity. Similarly, when the angularity is decreased the speed of the belt should be increased. Similarly, when the speed of travel of the forms is varied the angularity or speed of the belt, or both, may be varied all to the end that articles may be satisfactorily removed from the forms. For example, at a certain speed of travel of the forms the angularity of the belt may be small and the speed of the belt may be low. For a greater speed of travel of the forms the angularity or the speed of the belt may be increased. For still higher speeds of travel of the forms both the angularity and speed of the belt may be increased.

Preferably, the belt 18 is molded in a circle. When so molded it has a tendency to bow outwardly between the pulleys 12 and engage the article on the form between the supporting pulleys. This tendency is of advantage with the progressively increasing thickness of ring for the belt initially tends to press against the small diameter ring at the open end of the article and this pressure tends to increase as the article is rolled upon itself and the ring increases in thickness. This tendency of the belt to resume its circular molded shape makes it unnecessary to provide an abutment on the inside surface of the belt under usual operating conditions, altho the roller 13 is provided as a means for limiting the inward movement of the belt.

While the above described apparatus has been found to be commercially valuable in connection with thin walled elongated articles made from latex and the like, it is obvious that it may be used for removing articles of various other shapes and compositions from their forms.

Having thus described the invention so that others skilled in the art may be able to understand and practice the same, I state that what I desire to secure by Letters Patent is defined in what is claimed.

What is claimed is:

1. Apparatus for removing a thin walled article from a form which comprises a sidewise movable form having a free end and a supported end and adapted to carry thereon a thin walled article closed at one end, means for continuously moving said form sidewise, an endless belt disposed at a slight angle to the longitudinal axis of the form and engageable initially with the open end of an article on the form, and means for moving the article engaging portion of the belt toward the free end of the sidewise moving form.

2. Apparatus for removing a thin walled article from a form which comprises a sidewise movable form having a free end and a supported end and adapted to carry thereon a slightly distended thin walled article open at one end and closed at the other end, means for continuously moving said form sidewise, an endless belt of less width than the diameter of said form, said belt being disposed at a slight angle to the longitudinal axis of the form and initially engageable with the open end of an article on the form, and means for moving the article engaging portion of the belt toward the free end of the sidewise moving form.

3. Apparatus for removing a thin walled article from a form which comprises a sidewise movable form having a free end and a supported end and adapted to carry thereon a thin walled article closed at one end, means for rotating the form, means for continuously moving said form sidewise, an endless belt disposed at a slight angle to the longitudinal axis of the form and engageable initially with an article on the form remote from the closed end of the article, and means for moving the article engaging portion of the belt toward the free end of the rotating sidewise moving and rotating form.

4. Apparatus for removing a thin walled article from a form which comprises a sidewise movable form having a free end and a supported end and adapted to carry thereon a thin walled article open at one end and closed at the other end, means for continuously moving said form sidewise, an endless belt beneath and disposed at a slight angle to the longitudinal axis of the form and initally engageable with the open end of an article on the form while the form is passing over the belt, and means for moving the article engaging portion of the belt toward the free end of the form and thereby rolling the article upon itself and off the form during the time the form is passing sidewise over said belt.

5. Apparatus for removing a thin walled article from a form which comprises a sidewise movable form having a free end and a supported end and adapted to carry thereon a slightly distended thin walled article open at the end near to the supported end of the form, means for continuously moving said form sidewise, means for rotating the form while it is moving sidewise, an endless belt narrower than the diameter of said form and disposed at a slight angle to the longitudinal axis of the form and initially engageable with the open end of an article on the form, and means for moving the article engaging portion of the belt toward the free end of the form at such a speed that an article on the form will be rolled on itself and from the form while the form is rotating and moving sidewise past said belt.

6. Apparatus of the class described comprising a form having a free end and a supported end and adapted to carry thereon a thin walled article open at one end and slightly distended by said form, means for continuously moving said form sidewise, an endless belt narrower than the diameter of said form and disposed at a slight angle to the longitudinal axis of the form and initially engageable with the open end of an article on the form, means for rotating the form while it is moving sidewise past said belt, and means for moving the article-engaging portion of the belt toward the free end of the form at such a speed that an article on the form will be rolled upon itself and from the form while the form is rotating and moving sidewise past said belt.

JOHN R. GAMMETER.